April 16, 1963    C. BLOCK ETAL    3,085,668
MOTION STOP ASSEMBLAGE
Filed Feb. 20, 1959    5 Sheets-Sheet 1

FIG. 1

INVENTORS.
CHARLES BLOCK
ARNOLD O. DiGIULIO

BY  Eli Weiss
ATTORNEY

April 16, 1963   C. BLOCK ET AL   3,085,668
MOTION STOP ASSEMBLAGE
Filed Feb. 20, 1959   5 Sheets-Sheet 2

FIG.2

INVENTORS.
CHARLES BLOCK
ARNOLD O. DIGIULIO
BY Eli Weiss
ATTORNEY

April 16, 1963 C. BLOCK ETAL 3,085,668
MOTION STOP ASSEMBLAGE
Filed Feb. 20, 1959 5 Sheets-Sheet 3

Fig.3

INVENTORS.
CHARLES BLOCK
ARNOLD O. DIGIULIO
BY Eli Weiss
ATTORNEY

April 16, 1963 C. BLOCK ETAL 3,085,668
MOTION STOP ASSEMBLAGE
Filed Feb. 20, 1959 5 Sheets-Sheet 4

INVENTORS.
CHARLES BLOCK
ARNOLD O. DIGIULIO
BY Eli Weiss
ATTORNEY

April 16, 1963   C. BLOCK ETAL   3,085,668
MOTION STOP ASSEMBLAGE
Filed Feb. 20, 1959   5 Sheets-Sheet 5

INVENTORS.
CHARLES BLOCK
ARNOLD O. DIGIULIO
BY Eli Weiss
ATTORNEY

United States Patent Office 3,085,668
Patented Apr. 16, 1963

3,085,668
MOTION STOP ASSEMBLAGE
Charles Block, North Bellmore, and Arnold O. Di Giulio, Forest Hills, N.Y., assignors to Burroughs Corporation, Detroit, Mich., a corporation of Michigan
Filed Feb. 20, 1959, Ser. No. 794,663
10 Claims. (Cl. 192—149)

This invention relates generally to a motion stop assemblage and more particularly to a device which selectively decelerates a moving member rapidly to zero velocity without subjecting the moving member to discontinuous loadings.

Presently, a moving member can be decelerated to zero velocity by any one of a number of methods. In one method the energy of the moving member is dissipated by allowing the moving member to strike a spring; in another method the energy of the moving member is dissipated by means of a friction brake; and in still another method the energy of the moving member is dissipated by means of a dynamic braking device.

In each of these methods, however, the distance travelled by the moving member during deceleration is dependent, not only upon the mass of the moving member, but also upon the velocity of the moving member. Therefore, in any established system, a small variation in the velocity of the moving member will produce a variation in the distance travelled by the moving member during its deceleration period. However, if the final stop position of the moving member is critical relative to a fixed member, then additional structure of a non-yielding rigidly secured stop member such as a pin must be used to finally stop the moving member. Unfortunately, this method has many disadvantages, the major of which are that the moving member is subjected to a sudden shock when it strikes the rigid stop member; and that the moving member frequently bounces back immediately after it strikes the stop member to come to rest in a position displaced from the desired stop position.

It is a primary object of this invention to provide a motion stop assemblage which can decelerate and stop a moving member accurately relative to a fixed position.

It is another object of this invention to provide a motion stop assemblage which has relatively little inertia.

It is still another object of this invention to provide a motion stop assemblage which can selectively decelerate a moving member to a zero velocity without subjecting the moving member to discontinuous loadings which produce sudden shock conditions.

It is an additional object of this invention to provide a motion stop assemblage which is not affected by small variations in speed or weight of a moving member.

It is also an object of this invention to provide a motion stop assemblage which is economical to build and reliable in operation.

Other objects and many of the attendant advantages of this invention will be readily appreciated as the apparatus becomes better understood by reference to the following detailed description when considered in connection with the accompanying drawings wherein.

Similar reference numbers refer to similar parts throughout the several views of the drawings.

Briefly, the motion stop assemblage to be described as embodying the present invention comprises a moving member, an arm assemblage normally uncoupled from said member, and means for selectively coupling the arm assemblage to the moving member when the latter is to be decelerated to zero velocity. There is further provided a crank including a crank arm, and link means connecting the crank arm to the arm assemblage. The crank is normally positioned so that the crank arm is non-aligned with the link means. However, by virtue of the link means, the crank is rotatively driven by the arm assemblage, when the latter is coupled to the moving member, to the crank dead-center position where the crank arm is aligned with the link means. Means are provided for restraining the rotational movement of the crank, when it exceeds a predetermined velocity, so that the crank and the moving member will be decelerated to zero velocity in a shock-free manner.

Before the stopping mechanism is actuated, the crank arm is about 90° from its dead-center position with respect to the link which connects it to the arm assemblage. This is the point where it would exert maximum restraining force. As it moves to dead-center, the restraining force is decreased, for a given angular velocity. Thus, the crank and its restraining means control the deceleration of the moving member so that it will be maximum at the beginning of the stopping action and diminish in a gradual manner until the member comes to a stop.

Figure 3:
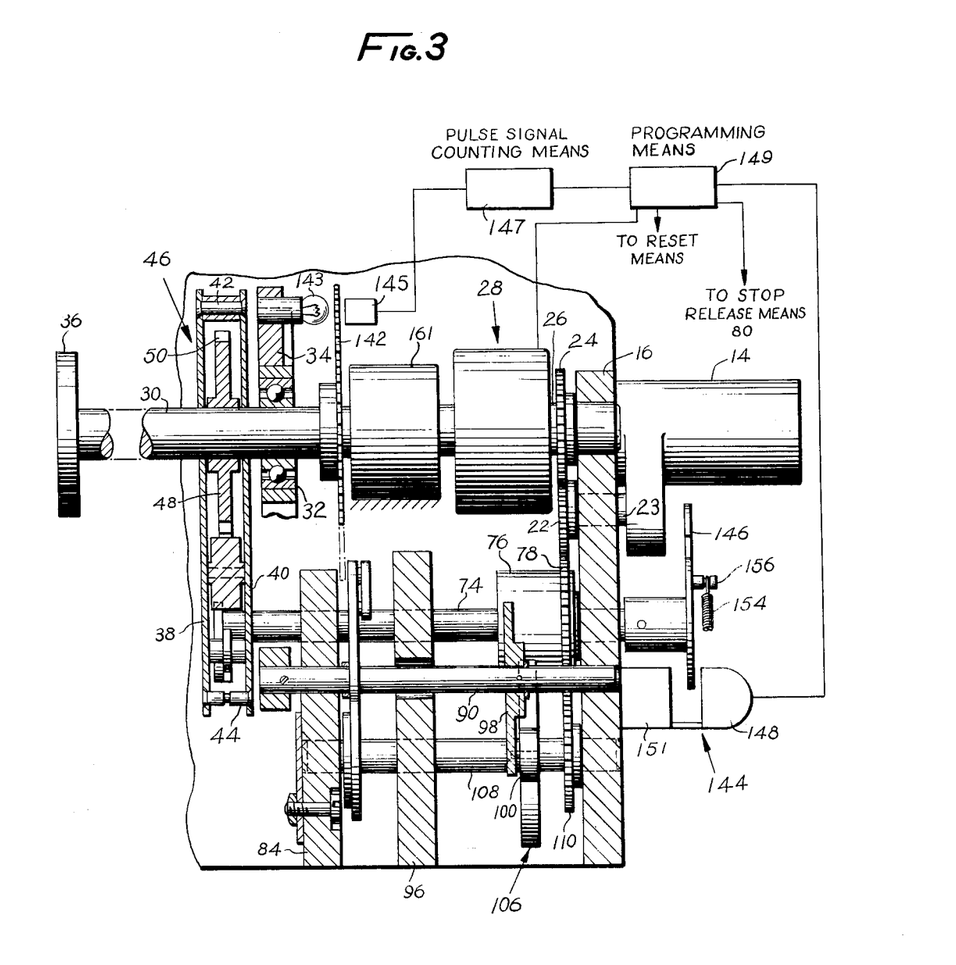
FIG. 3 is a sectional view along the line 3—3 of FIG. 1.

With reference to FIG. 3, there is illustrated a prime mover 14 such as an electric motor mounted securely to a mounting plate 16 by means of bolts or the like and positioned to drive a coupling gear 22 through its shaft 23. The coupling gear 22 engages and drives a gear 24 secured rigidly to a shaft 26 by a pin, set screw, or the like. One end of the shaft 26 is rotatably supported by the mounting plate 16, and the other end is coupled to an electrically operable clutch mechanism 28. Another shaft 30, aligned axially with the shaft 26 is rotatably supported by a low friction bearing 32 positioned in a mounting plate 34. One end of the shaft 30 is coupled to the clutch mechanism 28, and the other end is coupled to drive a member 36 either directly or through an appropriate gear train. The member 36 will hereafter be referred to as a moving member since it is this member which must be stopped accurately relative to a fixed position in a shock free manner.

Normally, shaft 26 is not coupled to shaft 30. However, energization of the clutch mechanism by an electrical signal couples the shaft 26 to the shaft 30. It should be understood that this procedure may be reversed in that a clutch mechanism which couples the shaft 26 to the shaft 30 when it is not energized can be used.

Two plates 38 and 40 maintained apart, parallel to each other by spacers 42, 44, are locked in position by means of screws, or the like to form an arm assemblage 46. This arm assemblage contains two aligned cutouts, one in each plate, each having a diameter equal to the diameter of the shaft 30. The shaft 30 is positioned within the aligned cutouts to rotatably support the arm assemblage. An index wheel 48 positioned between the plates 38 and 40 is secured rigidly to the shaft 30 by means of pins, set screws, or the like. The index wheel 48 comprises notches 50 positioned selectively around its periphery, and by positioning the index wheel between the plates 38 and 40 the arm assemblage is rotatably locked to the shaft 30. The notches 50 on the index wheel need not be spaced apart equal distances.

Figure 1:
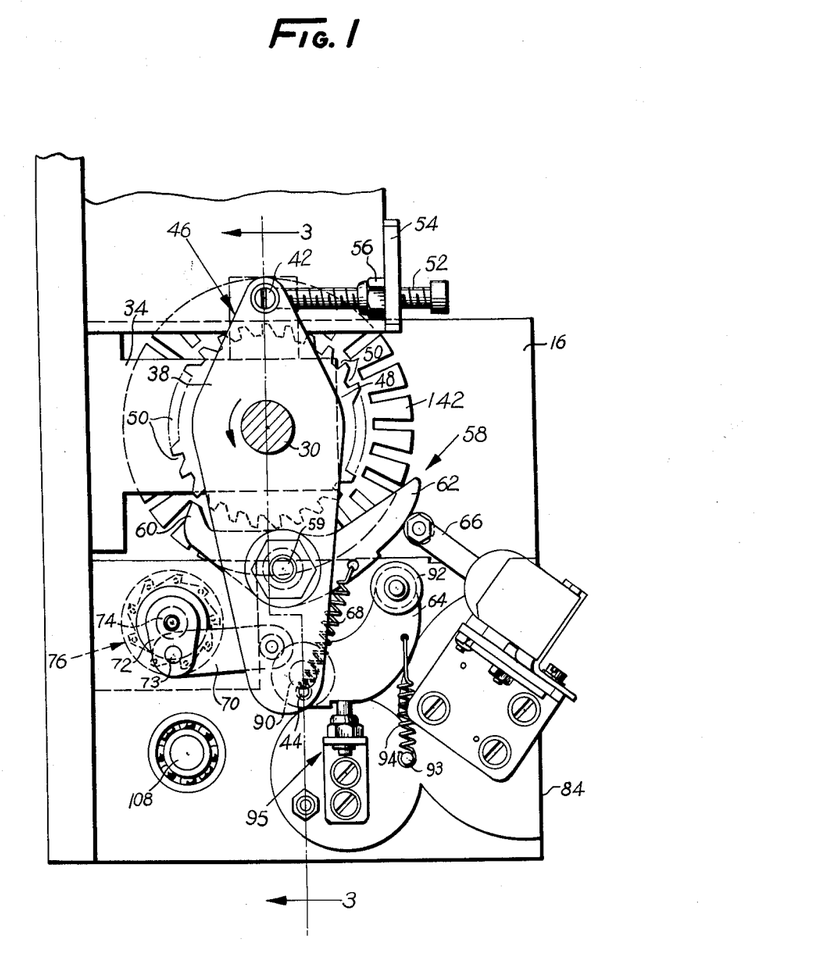
FIG. 1 is an end view of a motion stop assemblage in accordance with the principles of this invention illustrating the arrangement of structure prior to engagement for deceleration of a moving member.

With reference to FIG. 1, a stop bolt 52 threaded through a support bracket 54 and locked in position by a lock nut 56 cooperates with the spacer 42 to define the extreme clockwise position of the arm assemblage 46. A pawl 58 having two arms 60 and 62 is positioned between and pivotally coupled to the plates 38 and 40. The arm 60 of the pawl 58 supports a wedge shaped projection adaptable for engaging a notch 50 of the index wheel 48; and the other arm 62 of the pawl cooperates with a pawl return member 64, a holding member 66, and a spring 68. The pawl return member 64 disconnects the wedge shaped tooth of the pawl 58 from a notch 50 of the index wheel 48; and the holding member 66, when selectively activated, permits the spring 68 to urge the pawl to rotate in a clockwise direction to position the wedge shaped projection of the pawl within a notch 50.

Figure 2:
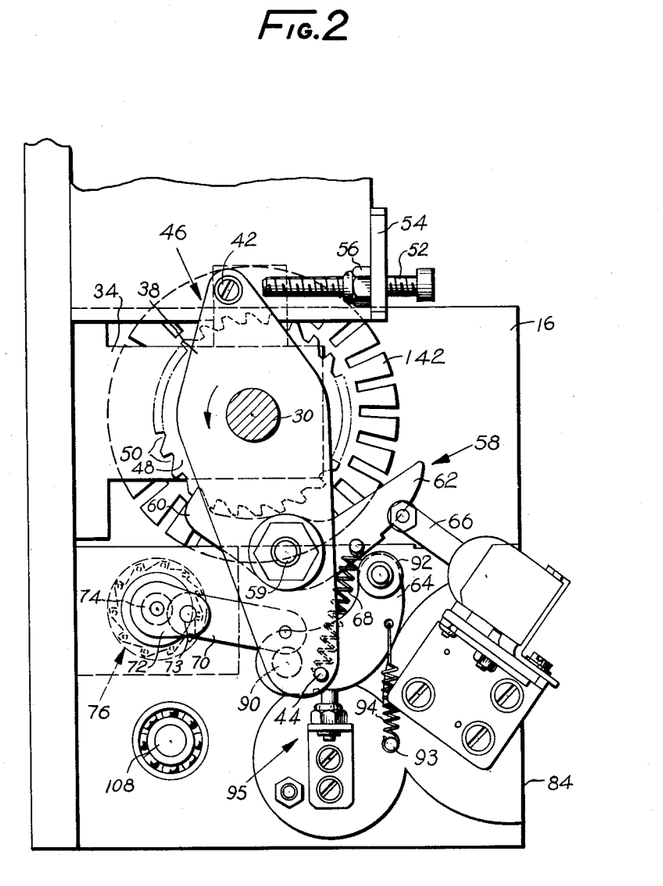
FIG. 2 is an end view of a motion stop assemblage in accordance with the principles of this invention illustrating the arrangement of structure after engagement and deceleration of a moving member.

An arm 72 coupled rigidly to a shaft 74 supports a projecting pin 73 to form a crank assemblage. One end of a connecting linkage 70 is pivotally connected to the projecting pin 73, and its other end is pivotally connected to the arm assemblage 46. The shaft 74 is rigidly connected to the inner race of a unidirectional rotary means such as an over-running clutch 76. The outer race of the over-running clutch 76 is secured rigidly to a gear 78 (FIG. 3) by means of pins, set screws, or the like. Gear 78 engages, and is driven by coupling gear 22. The over-running clutch 76 functions as a limiting or restraining means to impose a restraint when the maximum rotational speed of the shaft 74, and, therefore, of the crank assemblage exceeds a predetermined value. No restrictions are placed on the minimum rotational speed of the crank assemblage. FIGS. 1, and 2 illustrate one type of over-running clutch which can be used, it is to be understood, however, that any structure which can impose a restraint when the maximum angular velocity of the shaft 74 exceeds a predetermined value without imposing any limitations on the minimum angular velocity of shaft 74 can be used.

Figure 6:
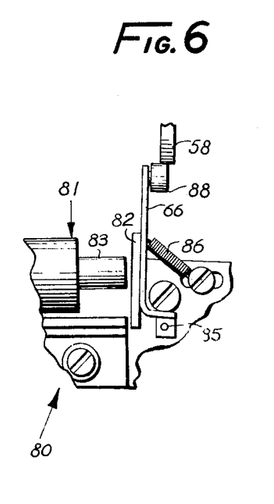
FIG. 6 is a side view of the stop release means prior to deceleration of a moving member.
Figure 7:
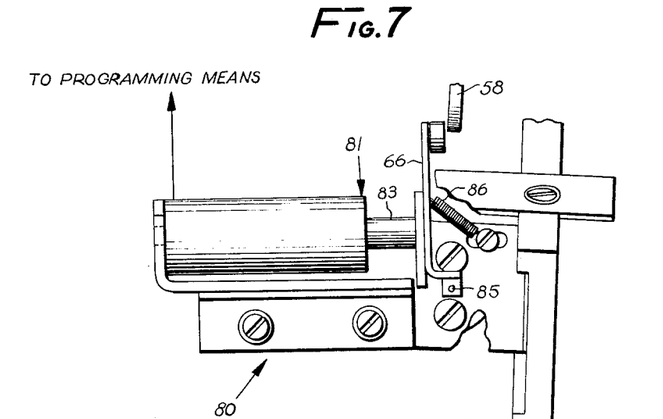
FIG. 7 is a side view of the stop release means during and after deceleration of a moving member.

With reference to FIGS. 6, and 7, there is illustrated the stop release or engaging means 80 which selectively permits the pawl 58 to be urged into engagement with a notch 50 on the index wheel 58 to be urged into engagement with a notch 50 on the index wheel 48 by a spring 68. FIG. 6 illustrates the arrangement of the structure of the stop release or engaging means 80 relative to the pawl 58 when the pawl is maintained free of the index wheel 48 as illustrated in FIG. 1. FIG. 7, illustrates the arrangement of the structure of the stop release or engaging means 80 relative to the pawl 58 when the pawl is in engagement with a notch 50 on the index wheel 48 as indicated in FIG. 2. An electromechanical means such as an electromagnet assemblage 81 having a magnetically influenced swingable member 82 is mounted securely to a mounting plate 84 (FIGS. 1, and 2) by means of screws or the like. The swingable member 82 is pivotally coupled to shaft 85 locked to plate 84, and is secured rigidly to a holding member 66 by spot welding, solder, screws, or the like; and urged to rotate in a clockwise direction away from the coil and towards the pawl 58 by a spring 86 acting in tension. A roller 88 rotatably supported by a shaft secured rigidly to the free end of the holding member 66 contacts the lower surface of pawl 58 when the electromagnet is not energized as illustrated in FIG. 6. At the instant that the coil of the electromagnet is energized, the holding member 66 is urged toward the coil against the action of the spring to remove the roller 88 from beneath the pawl 58 (FIG. 7), and the spring 68 (FIG. 1) urges the pawl 58 to rotate to permit the wedge shape projection of the pawl to engage a notch in the index wheel 48.

After a desired interval of time the pawl 58 is disengaged from the index wheel 48 by the action of the pawl return member 64. With reference to FIGS. 1 and 2, a shaft 90, rotatably supported at one end by mounting plate 16 and near its other end by plate 84 is secured rigidly to one end of the pawl return member 64 by pins, set screws, or the like. The other end of the pawl return member 64 supports a shaft which, in turn, rotatably supports a roller 92. A spring 94 positioned between the pawl return member 64 and a stationary pin 93 urges the return member 64 to rotate in a clockwise direction away from the pawl 58, its extreme position being defined by a stop structure 95. The roller 92 is aligned with the bottom surface of the pawl 58 to permit the pawl return member 64 to urge the pawl out of engagement with the index wheel 48.

Figure 4:
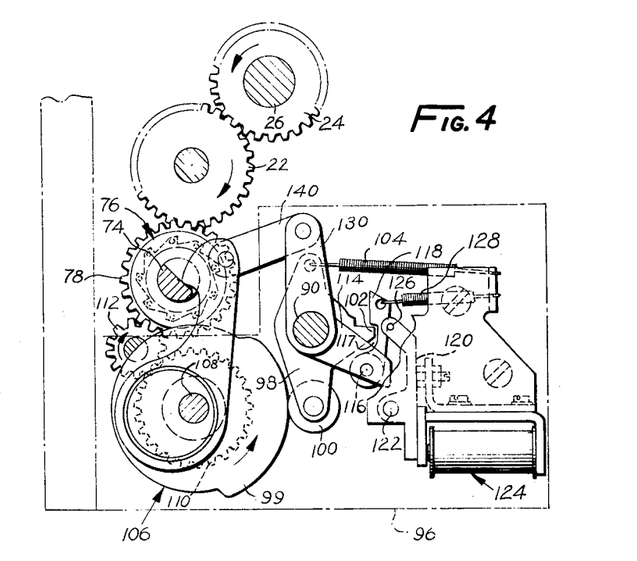
FIG. 4 is an end view of the motion stop assemblage with plate 84 removed and plate 96 shown in phantom to illustrate in detail the reset structure.

To disconnect the pawl 58 from the index wheel 48, the shaft 90 is oscillated once through a single cycle about its longitudinal axis by a reset means illustrated fully in FIG. 4. The pawl return member 64, driven by the shaft 90, moves against the action of the spring 94 to contact and urge the pawl 58 out of engagement with the index wheel 48 and beyond the surface of the roller 88 supported by the holding member 66. De-energization of the coil of the electromagnet 81 permits the spring 86 acting through the holding member 66 to position the wheel 88 under the pawl to maintain the pawl clear of the index wheel.

When the coil of the electromagnet assemblage is energized, the holding member 66 is drawn toward the core 83 against the action of the spring 86 and the roller 88 is removed from beneath the pawl 58 as indicated in FIG. 7.

With reference to FIG. 4, there is illustrated the reset structure which selectively cycles the pawl return member 64 through the shaft 90, and repositions the crank assemblage and arm assemblage each time the pawl is disengaged from the index wheel. A cam follower 98 rotatably supported on shaft 90 supports a cam follower roller 100, and an engaging projection 102. A spring 104 connected to the cam follower 98 urges the cam follower roller 100 into contact with the profile of a cam 106 secured rigidly to a shaft 108 by means of pins, set screws, or the like. The shaft 108 is rotatably supported by the mounting plates 84 and 16. A gear 110 secured rigidly to the shaft 108 is driven by gear 78 rotatably supported by the outer race of over-running clutch 76 through idler gear 112. The cam 106 is driven continuously and supports a rise projection 99 which cycles or oscillates the cam follower 98 about the shaft 90. An orienting arm 114 secured rigidly to the shaft 90 by means of pins, set screws, or the like supports a pin 116. A locking arm 118 having a cutout area 117 is rotatably supported by the pin 116. An orienting member 120 rotatably coupled to rotate about a pin 122 is secured rigidly to the movable member of an electromagnetic assemblage 124. A pin 126 secured to the orienting member 120 contacts the locking arm 118. A spring 128 positioned between the locking arm 118 and a fixed plate urges the locking arm 118 to rotate about the support pin 116 to maintain the locking arm 118 in continuous contact with the pin 126 of the orienting member 120.

Activation of the coil of the electromagnetic assemblage 124 urges the orienting member 120 to rotate counter-clockwise about the pin 122 to urge the locking arm 118, through the pin 126, to move against the action of the spring 128. The engaging projection 102 of the cam follower is positioned within the cutout 117 of the locking arm. Engagement of the rise 99 of the cam 106 by the cam follower roller 100 rocks the cam follower 98 and the engaging projection 102 through a given angular displacement. The locking arm 118 urged into engagement with the engaging projection 102 by means of the energized electromagnet is driven through the same angular displacement to rock the shaft 90 through the orienting arm 114. Angular displacement of the shaft 90 drives pawl return member 64 into pawl 58, and also drives arm 130 counterclockwise towards shaft 74 against the action of spring 94 which urges shaft 90 to rotate back to its original position.

Figure 5:
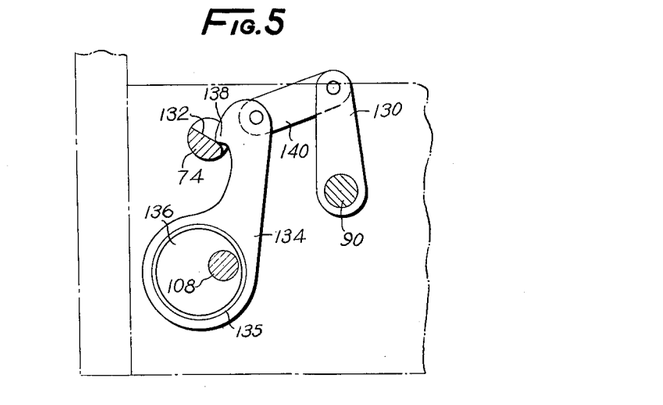
FIG. 5 is a view of the shaft return drive of the reset structure.

With reference to FIG. 5, there is illustrated the portion of the reset structure which drives the crank assemblage and arm assemblage back to its initial or set condition after the pawl 58 has been disengaged from the index wheel 48. A portion of the shaft 74 is preshaped to form a shaft return surface 132. A shaft driving member 134 contains a circular cutout 135 slidably positioned around an eccentric disk 136 keyed to shaft 108. One end of the driving member 134 is shaped to form a return surface engaging projection 138. A connecting link 140 is pivotally coupled to and connects the driver arm 130 to the shaft driving member 134. Normally, electromagnet assemblage 124 is not energized; spring 128 urges locking arm 118 out of engagement with engaging projection 102; and spring 94, acting through return member 64 urges shaft 90 to rotate to an extreme clockwise position defined by the stop structure 95 to disengage the shaft driving member 134 from the shaft return surface 132 by means of the driver arm 130 and the connecting link 140. However, when the electromagnet assemblage 124 is energized, and the shaft 90 is driven in a counterclockwise direction through the orienting arm 114, locking arm 118, cam follower 98, and cam 106; the driver arm 130 acting through the connecting link 140 positions the return surface engaging projection 138 into engagement with the shaft return surface 132. Continued rotation of the shaft 108 acting through the eccentric disc 136 enables the return surface engaging projection 138, in cooperation with the shaft return surface 132 to rotate the shaft 74 in a clockwise direction to reposition the crank assemblage and arm assemblage. De-energization of electromagnet assemblage 124 permits the shaft 90, acting through the driver arm 130 and connecting link 140, to urge the return surface engaging projection 138 to rotate about the eccentric disk 136 out of engagement with the shaft return surface 132.

In this device the angular position of the shaft 30, and of the indexing wheel 48 relative to a fixed position is indicated by a position indicating disk 142 (FIG. 3) positioned to selectively interrupt the light from a source of light 143 directed towards a light sensitive device 145 such as a photoelectric cell. The position indicating disk 142 is positioned between the plate 34 and the clutch mechanism 28, and is secured rigidly to the shaft 30 by solder, set screws, pins, or the like. The disk 142 supports a number of tooth shaped projections extending radially outward from the periphery of the disc and positioned to correspond to the positions of the notches 50 in the index wheel 48. Each tooth projection on the disk 142 indicates a stop position. A pulse signal counting means 147 fed by the light sensitive device indicates the stop position aligned for engagement with the pawl 58. Programming means 149, fed by the pulse signal counting means first selectively activates the stop release means 80 to accurately stop the shaft 30, and then selectively activates the reset means to reset the structure.

Figure 8:
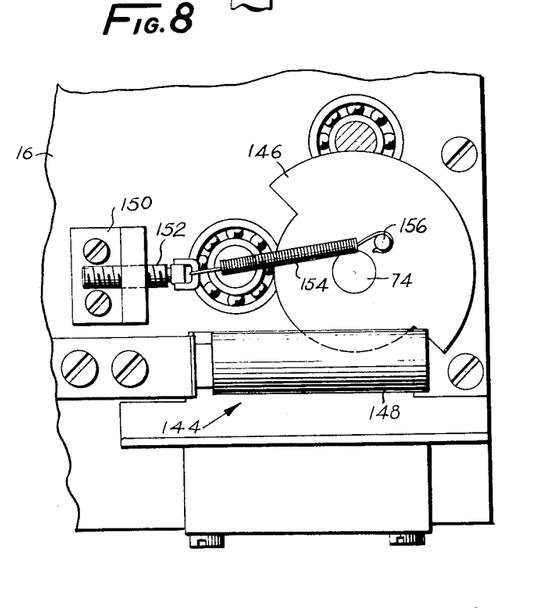
FIG. 8 is a back view of a motion stop assemblage in accordance with the principles of this invention illustrating a two position switch and holding member.

A switch or control means 144, FIGS. 3, and 8, selectively activates and deactivates the clutch mechanism 28 through the programming means, to couple the shaft 30 to the motor 14 when the shaft is being driven to a new preselected position, and to decouple the shaft 30 from the motor 14 when the shaft 30 is being stopped at a preselected position. A light shutter 146 having a cut away portion is secured rigidly to shaft 74 by screws, solder, or the like. A source of light 151 is positioned on one side of the shutter 146; and a light sensitive device 148 such as a photoelectric cell is positioned on the other side of the shutter 146 and aligned with the source of light. The shutter can assume one of two positions; the first (as indicated in FIG. 8) does not interrupt the light to the light sensitive device 148; while the second position does interrupt the light to the light sensitive device 148. A mounting bracket 150 secured to mounting plate 16 by screws or the like supports a threaded stud 152. One end of a spring 154 is connected to the stud 152, and the other end of the spring is connected to a pin 156 secured to a side of the shutter 146.

Operationally, shaft 74 can assume one of two extreme positions. One extreme position occurs when the pawl 58 is not engaged with the index wheel 48 (FIG. 1) and is determined by the setting of the stop bolt 52 and spacer 42. The other or second extreme position of shaft 74 occurs when the pawl 58 is engaged with and has stopped the index wheel 48 (FIG. 2) and is determined by the geometry of the linkage connecting the shaft 74 with the arm assemblage 46.

The spring 154 (FIG. 8) in combination with the pin 156 functions as a two position quick advance and holding mechanism. When the shaft 74 is advanced from one extreme position to the other, it first moves against the action of the spring 154. However, as soon as the pin 156 moves slightly past the horizontal, the spring, having been stretched to a maximum extreme, now snaps the shutter 146 to its new extreme position. The stud 152 is adjusted to maintain the spring 154 in tension under all conditions. In this manner the spring 154 urges the shutter 146 to remain in the selected extreme position.

When the shaft 74, and therefore the shutter 146 is in one extreme position, light to the light sensitive device 148 is intercepted by the shutter, and when the shaft 74 is in the other extreme position the light from the light source passes through the cutout area of the shutter to fall upon the light sensitive means. The light sensitive means 148 functions as a switch to deenergize the clutch mechanism 28 to disconnect the shaft 30 from the prime mover when the shaft 30 is to be stopped; and to energize the clutch to connect the shaft 30 to the prime mover when the shaft is to be driven to a new angular displacement.

With reference to the overall operation of this invention, shaft 30 is coupled, either directly or through an appropriate coupling device such as gears or the like to structure 36 which is to be first driven and then selectively decelerated from full to zero velocity without being subjected to discontinuous loadings which produce sudden shock producing forces.

Shaft 26, outer race of over-running clutch 76, and shaft 108, each are driven continuously at predetermined angular velocities by the motor 14 acting through shaft 23 and appropriate gears. Initially, it shall be assumed that the electromagnetic assemblage 124 of the reset means (FIG. 4) is deenergized; shaft 90 and return member 64 are urged to rotate to the extreme position defined by stop structure 95; pawl 58 is maintained out of engagement with the index wheel 48 by the holding member 66 and deenergized electromagnet assemblage of the stop release means 80 (FIGS. 6 and 7); the arm assemblage 46 is positioned to an extreme position defined by the spacer 42 and bolt 52, and is maintained in this extreme position by spring 154 acting through the crank assemblage (shaft 74, arm 72), and connecting linkage 70; the crank assemblage is positioned as shown in FIG. 1 wherein the crank arm is non-aligned with the link 70, being about 90° from dead-center; and clutch mechanism 28 is energized (or deenergized as the case may be) from a source of electrical energy to couple shaft 30 to shaft 26. Index wheel 48, and indicating disc 142, each coupled rigidly to the shaft 30 are driven by shaft 30. Continuation of these conditions (most clearly illustrated in FIG. 1) permits the motor 14 to drive shaft 30 at a fixed angular velocity.

In this invention, it is assumed that the moving member 36 is coupled directly to the shaft 30. Therefore, when the shaft is subjected to a decelerating force the moving member is subjected to that same decelerating force through the shaft. To stop the moving member 36, or the shaft 30 after it has been advanced to a predetermined position, a stop signal from the programming means energizes the electromagnet assemblage 81 to urge the holding member 66 to move out from beneath the pawl 58 against the action of spring 86 to permit spring 68 to urge pawl 58 to rotate clockwise about the pin 59 to position the wedge shaped projection of the pawl within a notch 50 of the index wheel 48. At the instant that the pawl engages a notch in the index wheel 48, the pawl 58, through the pin 59, transfers the energy from the shaft 30 to the arm assemblage 46 to drive the arm assemblage counter clockwise about shaft 30. Link 70, being connected between arm assemblage 46 and crank arm 72, rotates the crank to its dead-center position where the crank arm 72 is in alignment with the link 70, to decelerate shaft 30 to zero velocity. The deceleration is controlled so as to be substantially shock-free by virtue of over-running clutch 76 coupled to the crank assemblage, as to be later described. However, the inner race of the over-running clutch 76 is coupled to the arm assemblage 46 through the shaft 74, the arm 72, and the connecting linkage 70. Therefore, immediately after the pawl 58 engages the index wheel 48, the shaft 74 is driven by the rotational displacement of the arm assemblage 46 about the shaft 30, and light shutter 146 is immediately positioned to change the state of conductivity of the photoelectric cell 148 by interrupting the light to the cell 148. The switch means fed by the photoelectric cell 148 interrupts the flow of electricity to the clutch mechanism 28 to decouple the shaft 30 from the shaft 26.

For a given velocity, crank arm 72 exerts maximum restraining force at the beginning of the stopping action, where it is 90° from dead-center, and minimum restraining force at the end of the stopping action, where it assumes the dead-center position. The angular velocity of crank arm 72 is controlled by the over-running clutch 76. Since the inner race of the over-running clutch 76 cannot travel faster than the driven outer race of the over-running clutch 76, and since the shaft 74 is secured rigidly to the inner race of the over-running clutch, the shaft 74 functions as a control to progressively and continuously decelerate the index wheel 48 to a stop condition without subjecting the index wheel to discontinuous loadings or sudden shock producing forces through the action of the pawl 58 acting through the arm assemblage 46, connecting linkage 70, and arm 72.

When the index wheel 48, and therefore the shaft 30 reaches its stop position (FIG. 2), it is locked in position and is restrained from rotating in either direction by the geometry of the shaft 74, the arm 72, and the connecting linkage 70; and by an unidirectional rotary means or over-running clutch 161 coupled to the shaft 30. The over-running clutch 161 on the shaft 30 prevents the shaft 30 and index wheel 48 from rotating in a reverse or clockwise direction; and arm 72, and connecting linkage 70, acting through the arm assemblage 46 and pawl 58 prevents the shaft 30 and index wheel 48 from rotating in an advance or counterclockwise direction.

FIG. 1 illustrates an end view of the structure of this invention prior to the engagement of the pawl 58 with the index wheel 48; and FIG. 2 shows the same structure illustrated in FIG. 1 after engagement of the pawl 58 with the index wheel 48 where the shaft 30 was selectively decelerated from full to zero velocity in a continuous shock free manner.

After a predetermined interval of time a start signal is generated by the programming means to reset the structur to permit the shaft 30 to be driven to a new position by the motor 14. The start signal energizes the electromagnet assemblage 124 (FIG. 4) of the reset means to rotate the shafts 90 and 74; and deenergizes the electromagnet assemblage 81 of the stop release means (FIGS. 6, and 7) to permit the spring 86 to urge the holding member towards the pawl 58.

Energization of electromagnet assemblage 124 urges orienting member 120 to rotate counterclockwise about shaft 122 to position the cutout portion 117 of locking arm 118 adjacent to the engaging projection 102 of cam follower 98. Angular displacement of the cam follower 98 caused by engagement of the rise on the rotating cam 106 with the cam follower roller 100 is transmitted through the engaging projection 102, locking arm 118, and orienting arm 114 to rotate shaft 90 against the action of spring 94.

Pawl return member 64 secured rigidly to shaft 90 is urged against the action of spring 94 to disengage pawl 58 from index wheel 48. Spring 86 (FIG. 6) urges the holding member 66 into engagement with pawl 58 to retain the pawl 58 in its disengaged position. At the same instant, arm 130 coupled rigidly to shaft 90 (FIGS. 4, and 5) acting through connecting link 140 drives shaft driving member 134 counterclockwise about eccentric drive 136 to position the return surface engaging projection 138 adjacent to the shaft return surface 132. Rotation of shaft 108, acting through eccentric disk 136 urges the return surface engaging projection 138 to engage the shaft return surface 132 and rotate and reposition the shaft 74. Shaft 74, acting through arm 72, and connecting linkage 70, repositions arm assemblage 46 to the position defined by the spacer 42 and bolt 52; and also repositions light shutter 146 to condition the switch means 144 to energize the clutch mechanism 28 to couple the shaft 30 to the driven shaft 26.

Spring 154 retains shaft 74 in position. Spring 94, acting through pawl return member 64 drives shaft 90 back to its original position defined by the pawl return member 64 and the stop structure 95 after the rise on cam 106 rotates past the cam follower roller 100. When the switch means 144 energizes the clutch mechanism 28 it also deenergizes the electromagnet assemblage 124, and spring 128 urges locking arm 118 out of engagement with engaging projection 102.

The cam 106, and the eccentric disk 136 are each secured to shaft 108 and positioned accurately relative to each other to insure engagement of cam follower roller 100 when the eccentric disk 136 is positioned to drive the return surface engaging projection 138 into the shaft return surface 132 to rotate shaft 74. Spring 104 urges cam follower 98 to rotate about shaft 90 to insure continuous engagement between the cam follower roller 100 and cam 106.

After a predetermined angular displacement of shaft 30, measured by means of the indicating disc 142 positioned to interrupt a beam of light directed to a photoelectric cell 145, a pulse signal counting means 147, and a programming means 149, the electromagnetic assemblage 81 of the stop release means is selectively activated to permit the spring 68 to urge the pawl 58 into engagement with the index wheel 48 to again selectively decelerate the shaft 30 from full to zero velocity without subjecting the shaft to discontinuous loadings.

This is the normal mode of operation in which the mechanism may drive the member 36 any desired number of spaces 50. However, if it is desired to travel only one space, the electromagnet assemblage 80 of the stop release means need not be deenergized. If the mechanism is to be used for one space movements only, the stop release means is not required at all.

It is to be understood that where photoelectric cells are used in this description, they are used as switches, and that mechanically operated switches such as cam operated switches, rotary switches, commutators and the like may be used in their place.

Obviously many modifications and variations of the present invention are possible in the light of the above teachings. It is therefore to be understood that within the scope of the appended claims the invention may be practiced otherwise than as specifically described.

What is claimed is:

1. A motion stop assemblage comprising a moving member, an arm assemblage, engaging means to selectively couple said arm assemblage to said moving member, a crank including a crank arm carried thereby, link means connecting said crank arm to said arm assemblage, said crank being normally positioned such that said crank arm is non-aligned with said link means but being rotatably driven by said arm assemblage when said engaging means couples said arm assemblage to said moving member to the crank dead-center position where said crank arm is aligned with said link means, and means for restraining the rotational movement of said crank so that said moving member will be decelerated to zero velocity in a shock-free manner.

2. A motion stop assemblage comprising a moving member, an arm assemblage, a pawl pivotally coupled to said arm assemblage to engage selectively said moving member, a crank including a crank arm carried thereby, link means connecting said crank arm to said arm assemblage, said crank being normally positioned such that said crank arm is non-aligned with said link means but being rotatably driven by said arm assemblage when said pawl engages said moving member to the crank dead-center position where said crank arm is aligned with said link means, and means for restraining the rotational movement of said crank when it exceeds a predetermined velocity so that said moving member will be decelerated to zero velocity in a shock-free manner.

3. A motion stop assemblage comprising a moving member, an arm assemblage, a pawl pivotally coupled to said arm assemblage to engage selectively said moving member, a crank including a crank arm carried thereby, link means connecting said crank arm to said arm assemblage, said crank being normally positioned such that said crank arm is 90° from dead-center with respect to said link means but being rotatably driven by said arm assemblage when said pawl engages said moving member to the crank dead-center position where said crank arm is aligned with said link means, means for restraining the rotational movement of said crank so that said moving member will be decelerated to zero velocity in a shock-free manner, and reset means coupled to disengage said pawl from said moving member to permit said moving member to be advanced to a new position.

4. A motion stop assemblage comprising a rotatable member, driving means coupled to drive said rotatable member, an arm assemblage, engaging means to selectively couple said arm assemblage to said driven rotatable member, a crank including a crank arm carried thereby, link means connecting said crank arm to said arm assemblage, said crank being normally positioned such that said crank arm is 90° from dead-center with respect to said link means but being rotatably driven by said arm assemblage when said engaging means couples said arm assemblage to said driven rotatable member, to the crank dead-center position where said crank arm is aligned with said link means, and over-running clutch means for restraining the rotational movement of said crank when it exceeds a predetermined velocity so that said moving member will be decelerated to zero velocity in a shock-free manner.

5. A motion stop assemblage comprising a rotatable member, driving means coupled to drive said rotatable member, a clutch mechanism interposed between said rotatable member and said driving means, an arm assemblage, engaging means to selectively couple said arm assemblage to said driven rotatable member, a crank including a crank arm carried thereby, link means connecting said crank arm to said arm assemblage, said crank being normally positioned such that said crank arm is non-aligned with said link means but being rotatably driven by said arm assemblage when said engaging means couples said arm assemblage to said driven rotatable member to the crank dead-center position where said crank arm is aligned with said link means, control means coupled to said clutch mechanism to disconnect said driving means from said rotatable member when said engaging means couples said arm assemblage to said rotatable member, and limiting means driven at a substantially constant rotational speed by said driving means coupled to limit the maximum rotational speed of said crank.

6. A motion stop assemblage comprising a rotatable member, driving means coupled to drive said rotatable member, a clutch mechanism interposed between said rotatable member and said driving means, an arm assemblage, a pawl pivotally coupled to said arm assemblage positioned to engage said driven rotatable member, holding means positioned to maintain said pawl out of engagement with said rotatable member, electromechanical means coupled to selectively disengage said holding means from said pawl, a crank including a crank arm carried thereby, link means connecting said crank arm to said arm assemblage, said crank being normally positioned such that said crank arm is non-aligned with said link means but being rotatably driven by said arm assemblage when said pawl engages said rotatable member to the crank dead-center position where said crank arm is aligned with said link means, means for restraining the rotational movement of said crank so that said moving member will be decelerated to zero velocity in a shock-free manner, and control means coupled to said clutch mechanism to disconnect said driving means from said rotatable member when said pawl engages said rotatable member.

7. A motion stop assemblage comprising a rotatable member, driving means coupled to drive said rotatable member, a clutch mechanism interposed between said rotatable member and said driving means, an arm assemblage pivotally supported by said rotatable member, a pawl pivotally coupled to said arm assemblage positioned to engage said driven rotatable member, a holding member positioned to maintain said pawl out of engagement with said rotatable member, an electromagnet assemblage coupled to selectively disengage said holding member from said pawl, a crank including a crank arm carried thereby, link means connecting said crank arm to said arm assemblage, said crank being normally positioned such that said crank arm is non-aligned with said link means but being rotatably driven by said arm assemblage when said pawl engages said rotatable member to the crank dead-center position where said crank arm is aligned with said link means, control means coupled to said clutch mechanism to disconnect said driving means from said rotatable member when said pawl engages said rotatable member, limiting means driven at a substantially constant rotational speed by said driving means coupled to limit the maximum rotational speed of said crank, and reset means coupled to reset said crank and disengage said pawl from said moving member to permit said moving member to be advanced to a new position.

8. A motion stop assemblage comprising a rotatable member, driving means coupled to drive said rotatable member, an index wheel driven by said rotatable member, a clutch mechanism interposed between said rotatable member and said driving means, an arm assemblage, engaging means to selectively couple said arm assemblage to said index wheel, a crank including a crank arm carried thereby, link means connecting said crank arm to said arm assemblage, said crank being normally positioned such that said crank arm is non-aligned with said link means but being rotatably driven by said arm assemblage when said engaging means couples said arm assemblage to said index wheel to the crank dead-center position where said crank arm is aligned with said link means, control means coupled to said clutch mechanism to disconnect said driving means from said rotatable member when said engaging means couples said arm assemblage to said index wheel, and limiting means driven at a substantially constant rotational speed by said driving means coupled to limit the maximum rotational speed of said crank.

9. A motion stop assemblage comprising a rotatable member, driving means coupled to drive said rotatable member, a notched index wheel locked to said rotatable member, a clutch mechanism interposed between said rotatable member and said driving means, an arm assemblage pivotally supported by said rotatable member, a pawl pivotally coupled to said arm assemblage positioned to engage selectively a notch on said index wheel, a crank including a crank arm carried thereby, link means connecting said crank arm to said arm assemblage, said crank being normally positioned such that said crank arm is non-aligned with said link means but being rotatably driven by said arm assemblage when said pawl couples said arm assemblage to said index wheel to the crank dead-center position where said crank arm is aligned with said link means, position indicating means coupled to said rotatable member to indicate the angular displacement of said rotatable member, control means coupled to said clutch mechanism to disconnect said driving means from said rotatable member when said pawl couples said arm assemblage to said index wheel, and limiting means driven at a substantially constant rotational speed by said driving means coupled to limit the maximum rotational speed of said crank.

10. A motion stop assemblage comprising a rotatable member, driving means coupled to drive said rotatable member, a notched index wheel locked to said rotatable member, a clutch mechanism interposed between said rotatable member and said driving means, an arm assemblage pivotally supported by said rotatable member, a pawl pivotally coupled to said arm assemblage positioned to engage selectively a notch on said index wheel, a holding member positioned to maintain said pawl out of engagement with said notched index wheel, an electromagnet assemblage coupled to selectively disengage said holding member from said pawl, a crank including a crank arm carried thereby, link means connecting said crank arm to said arm assemblage, said crank being normally positioned such that said crank arm is non-aligned with said link means but being rotatably driven by said arm assemblage when said pawl couples said arm assemblage to said index wheel to the crank dead-center position where said crank arm is aligned with said link means, position indicating means coupled to said rotatable member to indicate the angular displacement of said rotatable member, control means coupled to said clutch mechanism to disconnect said driving means from said rotatable member when said pawl couples said arm assemblage to said index wheel, limiting means driven at a substantially constant rotational speed by said driving means coupled to limit the maximum rotational speed of said crank, and reset means coupled to reset said crank and disengage said pawl from said moving member to permit said moving member to be advanced to a new position.

References Cited in the file of this patent
UNITED STATES PATENTS

| | | |
|---|---|---|
| 1,220,787 | Reece | Mar. 27, 1917 |
| 1,243,986 | Schoenky | Oct. 23, 1917 |
| 2,633,957 | Gardinor et al. | Apr. 7, 1953 |
| 2,744,600 | Kohler et al. | May 8, 1956 |
| 2,777,552 | Flavin | Jan. 15, 1957 |